United States Patent [19]
Corompt

[11] 3,987,918
[45] Oct. 26, 1976

[54] DEVICE FOR LOADING OR UNLOADING BOXES OR REMOVABLE BUCKETS, IN PARTICULAR FOR LORRIES

[76] Inventor: Antoine Corompt, La Metare, rue Rembrandt, Saint-Etienne (Loire), France

[22] Filed: Dec. 9, 1974

[21] Appl. No.: 531,229

[30] Foreign Application Priority Data
Dec. 11, 1973 France ............................ 73.45381

[52] U.S. Cl. ............................ 214/505; 214/77 R; 214/515; 214/517
[51] Int. Cl.² ............................................ B60P 1/64
[58] Field of Search ................. 214/77 R, 505, 515, 214/517, 501, 506, 620

[56] References Cited
UNITED STATES PATENTS

| | | | |
|---|---|---|---|
| 2,954,885 | 10/1960 | Sexton | 214/515 X |
| 3,638,817 | 2/1972 | Corompt | 214/77 R X |
| 3,825,137 | 7/1974 | Mackrill et al. | 214/515 |
| 3,874,537 | 4/1975 | Kou | 214/515 X |

*Primary Examiner*—Robert G. Sheridan
*Attorney, Agent, or Firm*—Irving M. Weiner; Pamela S. Burt

[57] ABSTRACT

A handling device, in particular for lorries intended for handling boxes or containers, comprising a chassis on which arms are pivoted, which arms are adapted to handle removable buckets. The device is adapted to be mounted on a lorry specially intended for handling boxes or containers, and provided with suitable hoist means, such as either a rocking derrick or a cable winch.

10 Claims, 6 Drawing Figures

DEVICE FOR LOADING OR UNLOADING BOXES OR REMOVABLE BUCKETS, IN PARTICULAR FOR LORRIES

The present invention relates to a device for loading and unloading boxes or removable buckets. This device is, in particular, intended to be fitted to a lorry.

BACKGROUND OF THE INVENTION

It is known to link a rocking derrick to the rear of the chassis of a lorry through the agency of a sub-chassis, while a jack, which is pivoted on the chassis and the foot of the derrick, allows rocking the latter at will. The head of the derrick is provided with means which allow hooking a box in order to load it on the chassis of the lorry, or, on the other hand, to put it on the ground.

This kind of device is described, for instance, in the French Patent Application No. 72 19 596, filed on May 23, 1972, under the title "A self-contained device for handling containers on a lorry," and corresponding U.S. Pat. No. 3,878,948 issued Apr. 22, 1975 which is incorporated herein by reference.

There also exists another device, which is not intended for handling containers, but is intended, more particularly, for handling removable buckets. This device is constituted by two arms, which are pivoted on the rear of the chassis of the lorry, while two jacks, which are pivoted on the chassis and the arms, enable rocking the latter. The ends of the arms are provided with means for hooking a removable bucket either to be put on the chassis of the lorry, or, on the other hand, to be put on the ground. This kind of device is described, for instance, in French Patent No. 1,010,863 applied for on Jan. 24, 1950, under the title "Improvements in Movable Bucket Vehicles" which is incorporated herein by reference.

Another device is known, which allows loading or unloading containers. It is constituted by a sub-chassis pivoted on the rear of the chassis of the lorry. A mechanism, which includes a jack, allows lifting the sub-chassis, while a winch, the cable of which is disposed on the end of said sub-chassis, allows hoisting the container to be loaded. The lower part of the container is provided with two longitudinal rails, which bear, during the loading operation, on two rollers provided on the sub-chassis, immediately above the rear axle of the lorry.

This kind of device is described, for instance, in the French Patent No. 1,529,639, filed on Feb. 20, 1967, under the title "Improvements to Lorries and the Like Provided with a Device for Hoisting Containers which are Lying on the Ground," and corresponding U.S. Pat. No. 3,472,407 issued Oct. 14, 1969 which is incorporated herein by reference.

The three above types of handling devices have drawbacks, in that they do not allow handling both movable buckets and containers, and in that each of them requires using a lorry of a particular or special type.

An object of the present invention is to obviate such drawbacks by providing a device which enables removable buckets to be handled by a lorry intended to handle containers only.

SUMMARY OF THE INVENTION

A handling device according to the invention, in particular for a lorry intended for handling containers, by means of suitable hoist means, such as either a rocking derrick or a winch, is characterized in that it comprises a chassis, the front part of which is raised, and on the rear part of which two arms are pivoted, said arms being provided with means which allow loading or unloading the platform of the chassis by handling a removable bucket, while said chassis is provided in turn with means adapted to cooperate with the hoist means, such as a rocking derrick or a cable of the winch, in a manner such that the chassis can be either put on the ground or positioned on the lorry, where it is held by suitable means, so that it enables the lorry to handle containers as well as removable buckets.

According to another feature of the invention, the lower rear part of the chassis includes at least one bracket, which is adapted to be housed in a complementary part provided on the lorry, so as to be firmly held on the latter.

According to another feature of the invention, the housing part includes another bracket, which is directed towards the rear of the lorry, and under which the bracket provided on the chassis of the handling device comes to nest.

According to another feature of the invention, the lorry is provided with a rocking derrick which is pivoted on a movable auxiliary chassis, and the housing part is integral with said movable auxiliary chassis.

According to a modified embodiment, the lorry is provided with a winch which is mounted on the front end of a rocking sub-chassis intended to receive the handling device, while the housing part is integral with said sub-chassis.

According to another feature of the invention, the raised front part of the chassis of the device is provided with a horizontal and transverse spindle about which a hook is adapted to fit, said hook being fitted to the end of the rocking derrick of the lorry.

According to another feature of the invention, the lower front part of the chassis of the device is provided with means which are capable of cooperating with the winch cable so as to load or unload the device.

According to another feature of the invention, the chassis of the device is prolonged rearwardly by at least one crutch adapted to bear on the ground during the loading or unloading of removable buckets.

According to a modified embodiment, the chassis of the device is not provided with any crutch, but the rear part of the chassis of the lorry is provided with crutches which are likewise adapted to bear on the ground.

According to another feature of said modified embodiment, the crutches are roller crutches.

DETAILED DESCRIPTION

Figure 1:
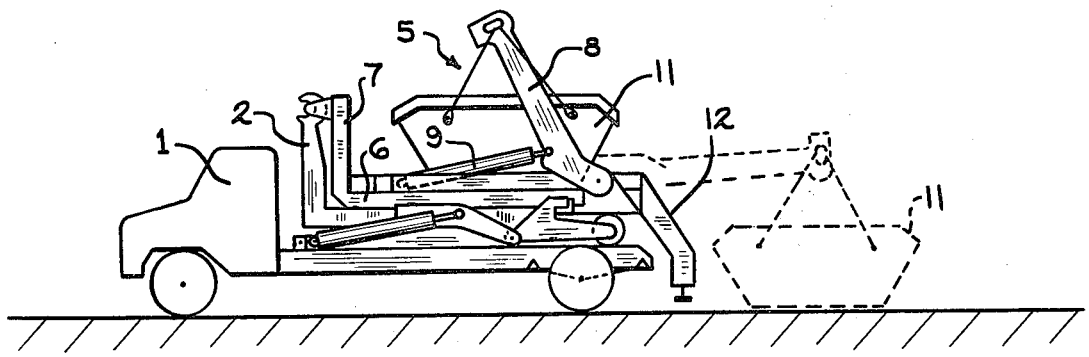
FIG. 1 is a view of a lorry equipped with a rocking derrick, and on which a device according to the invention is mounted.

FIG. 1 shows a handling device 5 according to the invention, which device is positioned on a lorry 1. The device 5 comprises a chassis 6, the front part 7 of which is raised. Arms 8 are pivoted on the rear part of said chassis 6, and acted upon by jacks 9. Said arms 8 are provided with means 10 (FIG. 2), which are adapted to be attached to a movable bucket 11, so as to load or unload said bucket.

Moreover, the chassis 6 is prolonged rearwardly by crutches or props 12, which are adapted to bear on the ground during the loading or unloading of a removable bucket 11.

Figure 2:
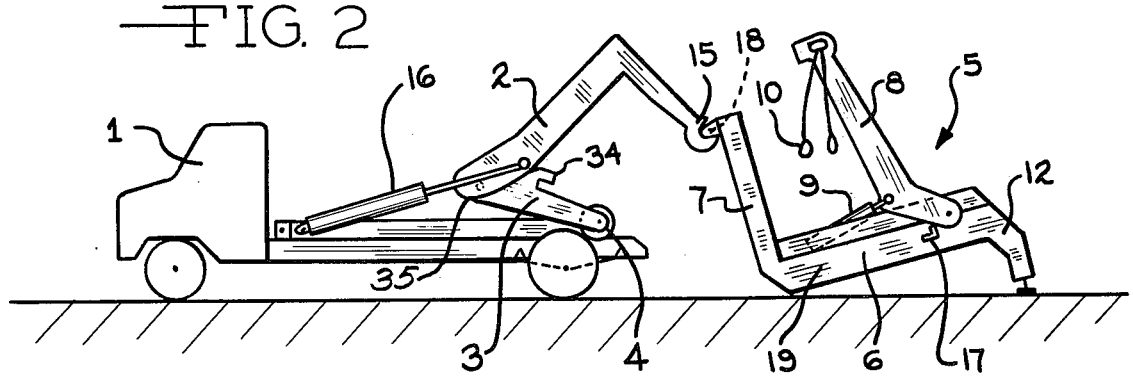
FIG. 2 is a view showing the way the device according to the invention operates.
Figure 3:
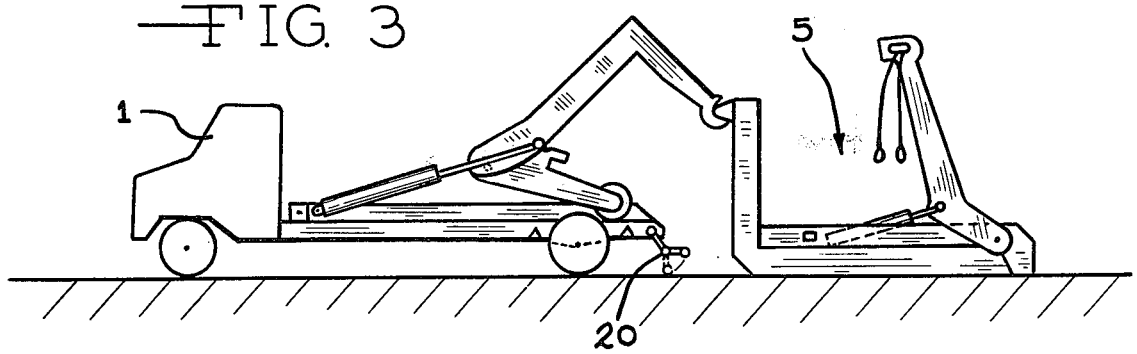
FIG. 3 is a view of a modified embodiment according to which the chassis of the device has no crutch.

The lorry 1 is provided with a rocking derrick 2, which is pivoted at 35 on a movable auxiliary chassis 3 (FIG. 2).

Said auxiliary chassis 3 is in turn pivoted on the rear part of the lorry 1. Moreover, rollers 4 (FIG. 2) are provided on either side of the rear part of the lorry 1. The end of the rocking derrick 2 includes a hook 15 (FIG. 2). Said derrick 2 is moved by jacks 16 (FIG. 2).

The chassis 6 of the handling device 5 includes a fixing bracket 17 (FIG. 2) at its lower rear part. Moreover, the end of the raised part 7 of the chassis 6 is provided with a horizontal transverse spindle 18, (FIG. 2), while the lower front part of the chassis 6 includes means 19 (FIG. 2), which are constituted, for instance, by a substantially horizontal transverse axis pin.

The movable auxiliary chassis 3 of the lorry 1 is provided with a bracket 34 (FIG. 2), which is mounted at the upper part thereof and directed towards the rear end of the lorry.

The operation is as follows:

When the chassis 6 has to be positioned on the lorry 1, the hook 15 of the rocking derrick 2 is brought to engage about the pin 18 provided at the end of the raised part 7 of the handling device 5. The positioning of the device 5 is carried out till the bracket 17 of the chassis 6 is nested under the bracket 34 of the lorry 1. The device 5 is then firmly held in position, and can be used to handle removable buckets 11 by means of the arms 8.

The rollers 4 make the loading and unloading of the device 5 easier.

During the handling of a removable bucket 11, the crutches or props 12 of the handling device 5 bear on the ground.

According to a modified embodiment, the handling device has no crutches, but the lorry 1 is provided with roller props 20.

The operation is the same as previously described hereinabove.

Figure 4:
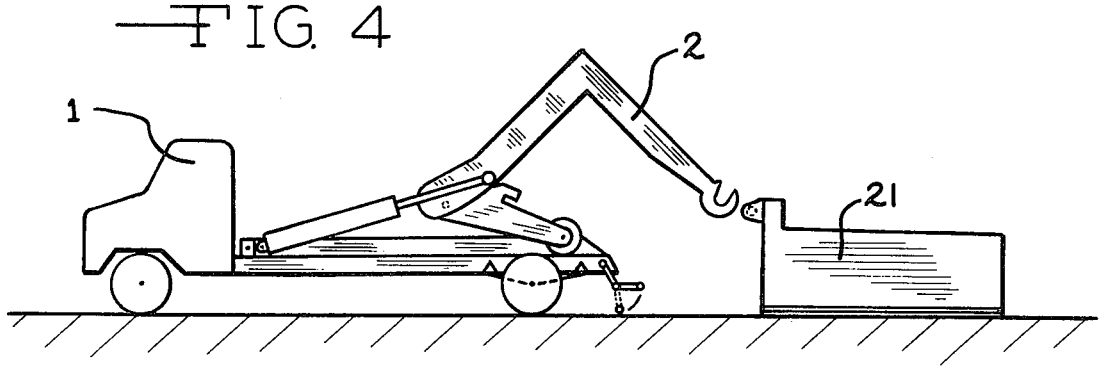
FIG. 4 is a view showing the way the rocking derrick operates.

Accordingly, the rocking derrick 2 can be used as well for handling boxes 21 (FIG. 4).

According to a modified embodiment, the handling device 5 is positioned on a lorry 1 equipped with a winch 25. Said winch 25 is mounted in a known way on the front end of a rocking sub-chassis 26, on which a mechanism 27 acts, which allows rocking said sub-chassis 26. Rollers 28 are provided on either side of the sub-chassis 26. The upper part of the latter is provided with a bracket 29, which is directed towards the rear part of the lorry 1.

The operation is as follows:

When the handling device 5 has to be positioned on the lorry 1, the end of the cable 30 of the winch 25 is tied on the horizontal axis pin 19 of said device 5. The latter is then hoisted on the rocking sub-chassis 26 till the bracket 17 of the device 5 is nested under the bracket 29 of the sub-chassis 26.

Of course, the lorry 1 can be used as well for handling a container 32 (FIG. 6), the lower body of which is provided with reinforcing rails 33.

Figure 5:
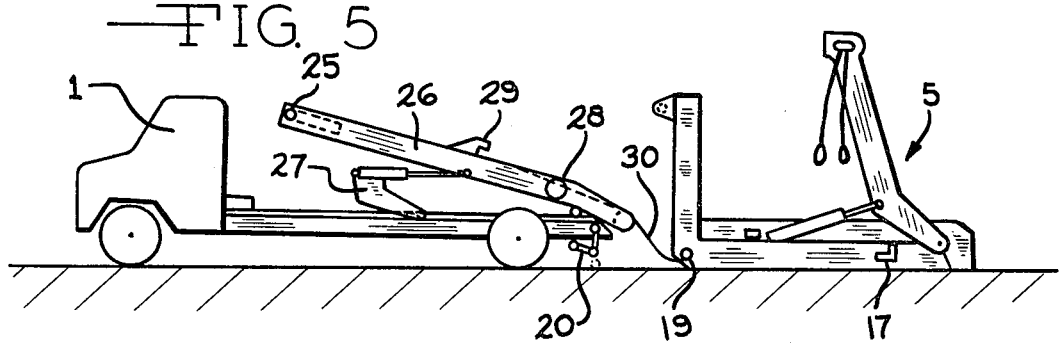
FIG. 5 is a view of a lorry equipped with a winch, and on which a device according to the invention is going to be positioned.
Figure 6:
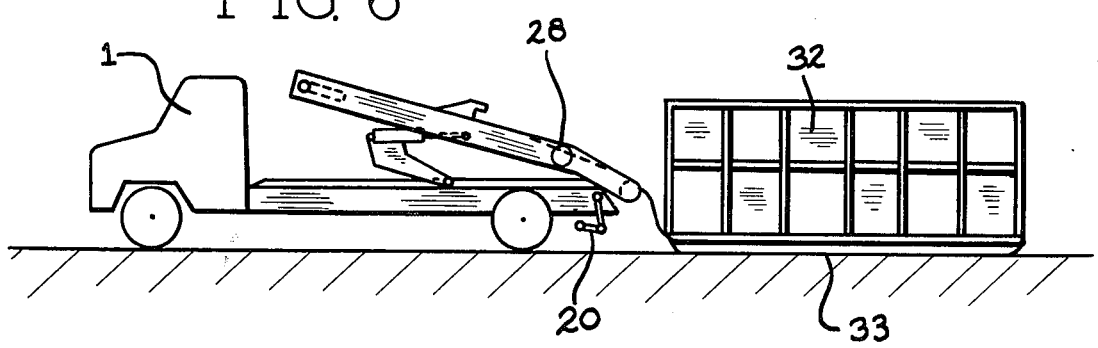
FIG. 6 is a view of the lorry of FIG. 5, on which a container is going to be disposed.

On the other hand, FIGS. 5 and 6 show a lorry 1, the rear part of which is provided with crutches or props 20. Obviously, as shown in FIG. 2, it is possible to provide props 20 on the device 5 instead of the lorry 1.

One essential advantage of the invention lies in the fact that it allows handling removable buckets by means of lorries specially intended for handling boxes or containers, and provided accordingly with suitable hoist means, such as rocking derricks or cable winches.

I claim:

1. A handling device, in particular for a lorry intended for handling containers by hoist means, comprising:

a chassis including a horizontal portion and a vertical portion extending upwardly from the forward end of said horizontal portion;

said chassis being provided with two arms pivoted on the rear part of said horizontal portion furthest from said vertical portion;

said arms being provided with means which are adapted to be attached to removable buckets to allow loading and unloading said removable buckets from the horizontal portion of said chassis;

said arms having connected thereto power means affixed to said chassis, said power means being adapted to impart pivotal movement to said arms to facilitate loading and unloading said removable buckets from the horizontal portion of said chassis;

said chassis is provided with means for selectively engaging said hoist means of said lorry so that said chassis can be hoisted into position on said lorry or laid on the ground to permit said lorry to handle said containers; and said chassis and said lorry are both provided with suitable engaging means for holding said chassis in position when on said lorry to permit said lorry to handle said removable buckets.

2. A handling device according to claim 1, characterized in that said engaging means for holding said chassis in position when on said lorry comprises at least one bracket provided on the lower rear part of said chassis adapted to be nested in a complementary member provided on said lorry so that said handling device is firmly held on said lorry.

3. A handling device according to claim 2, characterized in that said complementary nesting member includes a bracket which is directed towards the rear of said lorry, and under which a bracket of said chassis of said device comes to nest.

4. A handling device according to claim 2 characterized in that said lorry is provided with a main chassis, said main chassis being provided with an auxiliary chassis pivotally secured thereto; said hoist means of said lorry includes a rocking derrick which is pivoted on said auxiliary chassis; and said complementary nesting member is integral with said auxiliary chassis.

5. A handling device according to claim 2, characterized in that said hoist means of said lorry includes a winch which is mounted on the front end of a rocking sub-chassis; and said complementary nesting member is integral with said sub-chassis.

6. A handling device according to claim 1, characterized in that:
   said lorry is provided with a main chassis, said main chassis being provided with an auxiliary chassis pivotally secured thereto;
   said hoist means of said lorry includes a rocking derrick which is pivoted on said auxiliary chassis;
   said rocking derrick includes a free extending elongated portion having a hook provided at one end thereof;
   the upper end of said vertical portion of said chassis of said handling device is provided with a substantially horizontal and transverse spindle about which said hook is adapted to engage, such that when said hook is in engagement with said spindle said chassis can be hoisted into position in said lorry by said rocking derrick.

7. A handling device according to claim 1, characterized in that:
   said lorry is provided with a main chassis, said main chassis having mounted longitudinally thereon an elongated rocking sub-chassis;
   said hoist means of said lorry includes a winch which is mounted on the portion of said rocking sub-chassis nearest the cab of said lorry;
   and the lower front part of said chassis of said device is provided with means adapted to cooperate with a cable of said winch so as to load or unload said device.

8. A handling device according to claim 1, characterized in that said chassis of said device is prolonged rearwardly, by at least one crutch or prop adapted to bear on the ground when buckets are being loaded or unloaded.

9. A handling device according to claim 1, characterized in that the rear part of said chassis of said lorry is provided with crutches or props pivotally adapted to bear on the ground when removable buckets are being loaded or unloaded.

10. A handling device according to claim 9, characterized in that the crutches are roller crutches.

* * * * *